May 26, 1925.   1,539,575

K. KEHRBECK ET AL

SURFACE MEASURING MACHINE

Filed Jan. 8, 1923   2 Sheets-Sheet 1

Inventors:
Karl Kehrbeck
Ernst Paul Bohacek
by G. A. Taube

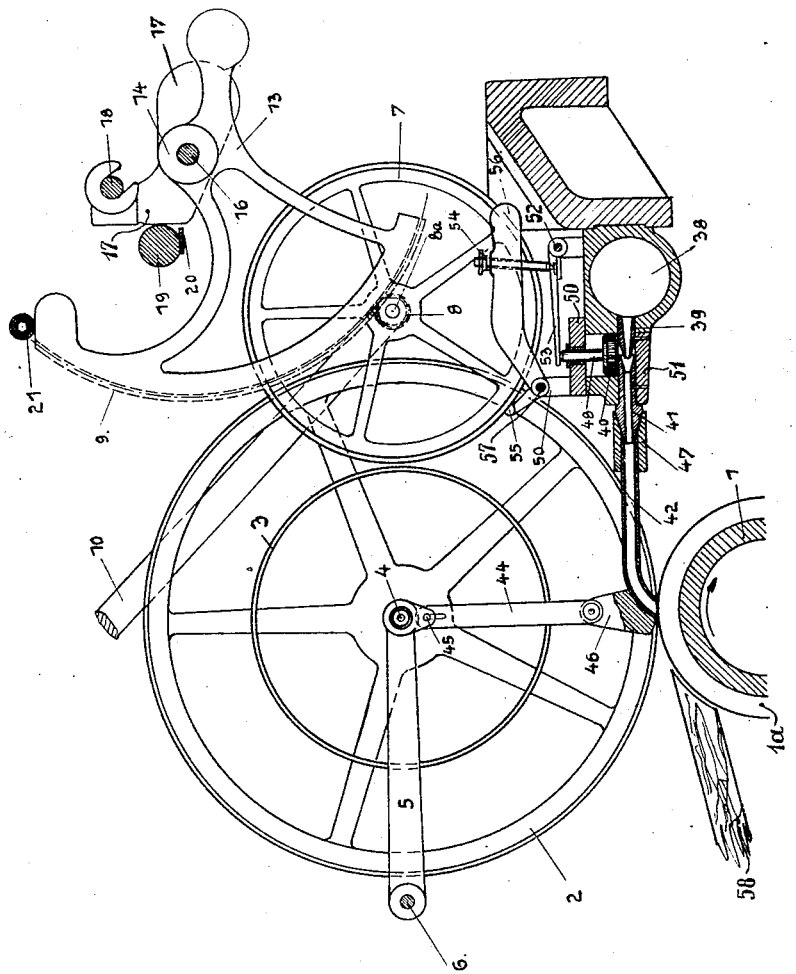

Patented May 26, 1925.

1,539,575

UNITED STATES PATENT OFFICE.

KARL KEHRBECK AND BRUNO PAUL BOHACEK, OF FRANKFORT-ON-THE-MAIN, GERMANY, ASSIGNORS TO MASCHINENFABRIK MOENUS AKTIEN-GESELLSCHAFT, OF FRANKFORT-ON-THE-MAIN, GERMANY.

SURFACE-MEASURING MACHINE.

Application filed January 8, 1923. Serial No. 611,508.

*To all whom it may concern:*

Be it known that we, KARL KEHRBECK and BRUNO PAUL BOHACEK, the first a citizen of Germany, the other a citizen of Hungary, and both residents of Frankfort-on-the-Main, Germany, have invented a new and useful Improved Surface-Measuring Machine, of which the following is a specification.

This invention relates to a surface measuring machine for leather and the like having suitable measuring elements acting on an adding-up mechanism. The main feature of the invention is that the coupling of the individual measuring elements with the adding-up mechanism is effected in the right moment pneumatically. This is preferably effected by pipes intended to conduct currents of air terminating at the place of contact between the material to be measured and a carrier roller, and by the feature that the flow of the air through said pipes is checked by the respective piece of material, generating a reactive pressure which is utilized for the measurement. In this way material drawbacks of the purely mechanically working measuring machines are obviated and a very exact measurement is rendered possible.

According to this invention, the transmission of the reactive power upon the coupling members is effected by the mediation or air pistons, valves, or the like, and it is made possible by this procedure to obtain a considerably more powerful effect than can be obtained by the use of free air currents.

The air pistons, valves, or the like, act in the right moment upon cheeks which release transmission wheels inserted into the adding-up mechanism. When the parts concerned are uncoupled, these wheels are thrown out of gear, and are braked at the same time.

The machine is improved also as regards other details important for the exactness of the measurement. Thus, for instance, the lowering of the transmission segments, when engaging the teeth, is effected in such a manner that the counting mechanism is not affected in spite of the then arising slight rotary motion of the transmission segments. The so-called "tooth-engaging fault" caused by an incomplete engaging of the teeth concerned is done away with.

Figure 1:
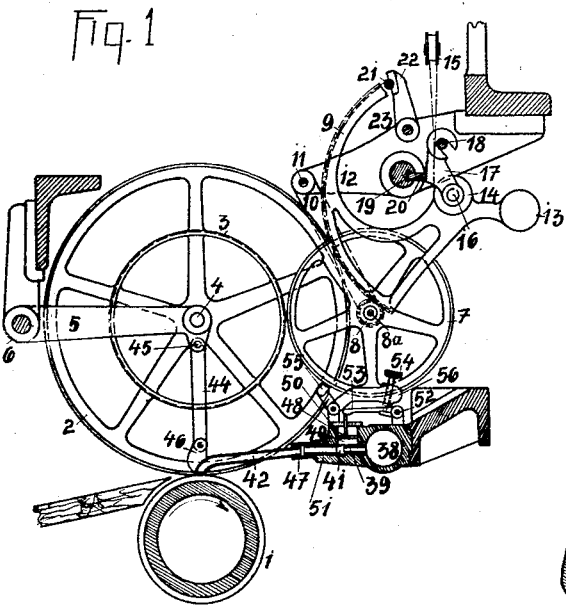
Figure 2:
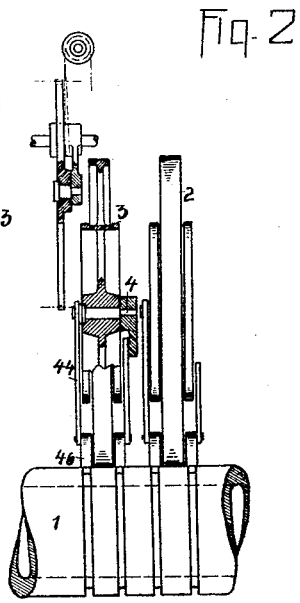
Figure 3:
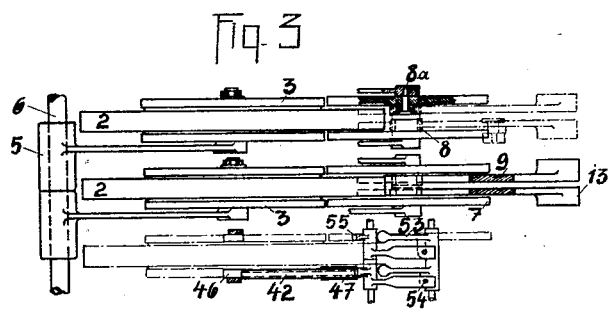
Figure 5:
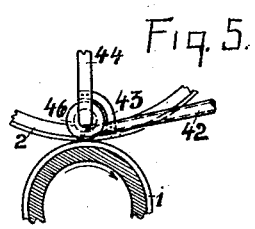
Figure 4:
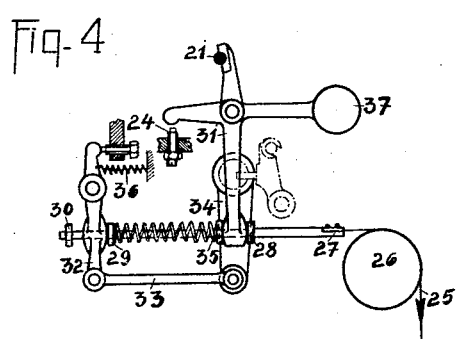

The surface measuring machine may be operated with compressed air, as well as by suction air. The accompanying drawings show the machine arranged for compressed air, Figure 1 representing a cross-section of the machine shows the gearing necessary for the measuring mechanism. Figure 1ª is a view similar to Fig. 1, and shows the greatest part of the arrangement and combination of parts illustrated in Fig. 1 drawn to a larger scale. Figure 2 is a front-view of the parts illustrated in Figure 1. Figure 3 shows a plan of the internal gearing. Figure 4 is a side-view of a certain cooperating mechanism which is also fully described hereinafter. Figure 5 shows certain details which are also dealt with hereinafter.

The pieces of leather or the like to be measured are moved forward by a roller 1 supported in the frame (not shown) of the machine and being provided with, and driven by, a pulley (not shown), and having a plurality of parallel circumferential grooves $1^a$. Above this roller is a plurality of measuring wheels 2, each of which has at each side an additional rim 3 of considerably smaller diameter than the diameter of the respective measuring wheel.

The measuring wheels are supported by bolts 4 fastened in levers 5 and slewable, together with said bolts, on a shaft 6. Each measuring wheel co-operates with two transmission wheels 7 which are so arranged as to be able to contact with the additional rims 3 and then transmit the rotation, by the mediation of cog-wheels 8, to cogged sectors 9.

The transmission wheels 7 are supported by bolts $8^a$ and may be slewed by means of levers 10 and a shaft 11 supported in arms 12 carried by the frame of the machine.

The sectors 9 are balanced by counterpoises 13 and have each a hub 14 at which a chain 15 establishing a connection with an adding-up mechanism (not shown) and operating this latter in known manner is fastened.

Each sector 9 is rotatably mounted upon a pivot 16 affixed to a lever 17 supported by a bolt 18 and having a projection $17^a$ which can contact with a ledge 20 attached to a shaft 19. The pivot 16, owing to the particular arrangement and combination of the parts supporting it, moves in a curved path, in such a way, that the adding-up mechanism is not actuated. The object of this arrangement is to obviate measuring faults that may arise if the cogged members of the apparatus mesh but incompletely with each other. If, namely, when the cogged sectors 9 get down upon the cog-wheels 8, the tops of the teeth get located upon one another, the cog-wheels 8 do not at once take the segments 9 with them, but this occurs only when the radially directed flanks of the teeth contact with each other. The dead play in the transmission wheels entails a difference in the length measured, which, however, is obviated by moving during that time in which the teeth mesh the pivot of the toothed sectors, in such a manner that the then arising backward rotation does not affect the index.

The position of the toothed sectors in downward direction is limited by the ledge 20 which contacts with the projection 17a of the lever 17.

The upper ends of the toothed sectors 9 contact in their initial position with a rubber-covered rod 21 which is secured to a rail 22 and can be slewed around a shaft 23 whereby it is rendered possible to lift the ledge 21 as soon as toothed sectors, after the measurement has been finished and the sectors have fallen back into their initial position, mesh again with the gears. The toothed segments may, thus, make a slight rotation in backward direction if the reciprocal engagement of the teeth requires it.

The lowermost position of the india-rubber ledge 21 is determined by an adjusting screw 24. The ledge is actuated from a treadle (not shown) by the intermediary of a chain 25 (Figure 4) which is led over a roll 26 and is connected with a rod 27 guided in arms 31 and 32. The arm 32 is connected by a rail 33 with a lever 34 affixed to the shaft 19. When the treadle is depressed, a collar 29 of the rod 27 takes the arm 31 along with it by the mediation of an appropriately interposed spring 35, whereby the india-rubber ledge 21 is moved into its lowermost position. This having been done, the arm 32 is turned by a collar 30 provided at the end of the rod 27, in consequence of which the ledge 20 which is secured to the shaft 19 abuts against the lever 17 and turns it upon the shaft 18, whereby the toothed segments get disengaged from the gears 8. A consequence of this is that said segments now fall back into their initial position which is limited by the india-rubber ledge 21.

When the treadle has been released, the reverse of what has just been described takes place. First the toothed sectors 9 move downwards so that their teeth mesh again with the gear 8; then the rubber-covered rod is lifted so that the toothed sectors are able to make another rotary motion in backward direction, if this is necessary for the proper meshing of the teeth. Moving the arms 32 31 back into their former position is effected either by a spring 36 which acts upon the upper ends of those arms or by the counterpoise 37.

Supplying the compressed air is effected by means of a blower (not shown) which forces the air into a tube 38 connected with the cylinder 40 by a pipe 39. The air passes also through nozzles 41 and then enters pipes 42, the nozzle-shaped ends of which are bent downwardly and so arranged that the issuing air enters into the grooves 1a turned into the feeding roller 1. The discharge-opening of the pipe 42 lies in the line of contact between the measuring wheels and the feeding roller. The pipes 42 are connected with rods 44 by means of segments 43, and said rods are connected at their upper ends with the levers 5 by means of pivots 45, and each rod has at its lower end a running roll 46, the flanges of which embrace the bent end of the respective pipe. The other end of each pipe is connected with a sleeve 41 by means of an india-rubber sleeve 47. Owing to the connection between the pipes 42 and the levers 5 the former move upwards and downwards together with the measuring wheels.

The cylinders 40 contain pistons 48 which, preferably, are made of a light metal in order to prevent their material from detrimentally affecting the result of the measuring procedure. Each piston has a cylindrical shaft that is guided in a plate 50. The lower end of each cylinder is tightened by a plate 51. The pistons act upon levers 53 which are turnable upon pivots 52 and the movements of which are transmitted, by an adjustable screw 54, to levers 55 that are movable upon a shaft 57 and contact at one end with the transmitting wheels 7. At their lower ends the levers 55 have each a poise 56, which tends to press the lever 55 against the transmission wheels 7 and to lift them off the wheel rims.

The manner of operation of the machine is as follows:

As soon as the piece of leather or other material to be measured has been sufficiently far pushed forward upon the machine table, it is seized by the roller 1 and the measuring-wheels 2, whereby the discharge apertures of the pipes 42 which lie in the measuring zone are closed and the escape of air is wholly or partly prevented, in consequence of which the pistons 48 are lifted by the compressed air so that the lever-arms 55 are moved off the transmission wheels 7. These latter are now free and move towards the rims 3 under their own weight and contact finally with them, whereby the transmission wheels are rotated and act now upon the adding-up mechanism which is of known construction.

When the piece of material measured has left the machine, the apertures of the pipes 42 are no more checked, in consequence of which the compressed air can freely escape so that the pressure is now lowered in the cylinders 40 and the pistons move downwards. The poises 56 now make the lever-arms 55 again contact with the transmission wheels, lift them off the rims 3 and brake them whereby these wheels are prevented from further acting upon the adding-up mechanism.

After having read the measure on the scale the attendant actuates the treadle whereby in the first place the rubber-covered rod 21 is lowered and then the cogged sectors 9 are disengaged as regards the cog-wheels 8, so that they can fall back into their original position.

After the treadle has been released, first the toothed sectors mesh with the cog-wheels 8; then the rubber-covered rod 21 is lifted so that the radially extending flanks of the co-operating teeth can contact properly with each other. Whilst this occurs, the axles 16 of the toothed sectors are so moved that the adding-up mechanism is not actuated. As the measuring wheels are being vertically lifted by the piece of leather under operation, and as the transmission wheels are so arranged that they are moved chiefly horizontally by the lever-arms 55, the thickness of the respective material to be measured is without influence upon the distance between the transmission wheels and the rims, and the time at which they are coupled, as described, is, thus, independent of the thickness of the respective material to be measured.

It is a matter of course that many details of the novel machine may be modified without departing from the subject-matter of the invention.

We claim:

1. A surface measuring machine, comprising, in combination: measuring-wheels, and means for feeding forward below them the blank to be measured; an adding-up mechanism; pneumatic means arranged between said feeding means and said adding-up mechanism and adapted to cause automatically the said mechanism to operate when a blank is caused to pass through between said measuring-wheels and the said feeding means; air-pipes forming parts of said pneumatic means and having their orifices located between the measuring-wheels at the points of contact between them and the blank, this latter closing said orifices when being fed forward, substantially as set forth.

2. A surface measuring machine, comprising, in combination: measuring-wheels, and means for feeding forward below them the blank to be measured; an adding-up mechanism, and means to transmit motion from said measuring-wheels to this mechanism; friction-wheels forming parts of the motion-transmitting means, and pneumatically operated brakes for said wheels; pneumatic means arranged between said feeding means and said adding-up mechanism and adapted to cause automatically the said mechanism to operate when a blank is caused to pass through between said measuring-wheels and the said feeding means; air-pipes forming parts of said pneumatic means and having their orifices located between the measuring-wheels at the points of contact between them and the blank, this latter closing said orifices when being fed forward; and pneumatically operated means for releasing said brakes and being subjected to air-pressure when the orifices of the said tubes are closed by the blank to be measured, substantially as set forth.

3. A surface measuring machine, comprising, in combination: measuring-wheels, and means for feeding forward below them the blank to be measured; an adding-up mechanism, and means to transmit motion from said measuring-wheels to this mechanism; friction-wheels forming parts of the motion-transmitting means, and pneumatically operated brakes for said wheels; pneumatic means arranged between said feeding means and said adding-up mechanism and adapted to cause automatically the said mechanism to operate when a blank is caused to pass through between said measuring-wheels and the said feeding means; air-pipes forming parts of said pneumatic means and having their orifices located between the measuring-wheels at the points of contact between them and the blank, this latter closing said orifices when being fed forward; air-cylinders connected with the said air-pipes; pistons in said cylinders; braking levers arranged to brake and to release said motion-transmitting wheels; and mechanical motion-transmitting means arranged to be actuated by the said pistons and to move the braking parts of the said levers of the friction-wheels when the pistons are lifted by the air pressed into the said pipes, substantially as set forth.

4. A surface measuring machine, comprising, in combination: measuring-wheels, and means for feeding forward below them the blank to be measured; an adding-up mechanism, and means to transmit motion from said measuring-wheels to this mechanism; pairs of friction-wheels, one wheel of each pair being connected with the measuring-wheel adjacent to it, the other wheel of each pair being arranged in the plane of the first and to be moved off the same in said plane; said friction-wheels forming parts of said motion-transmitting means; pneumatically operated braking means for these friction-wheels which are not connected with the measuring-wheels, these means comprising air-cylinders, pistons therein, double-armed braking-levers consisting each of a short arm forming a braking shoe at its end, and of a long arm forming a poise adapted to move the appertaining friction-wheel off its mate; air-pipes forming parts of the said pneumatic means and communicating with said cylinders and having their orifices located between the measuring-wheels at the points of contact between them and the blank, this latter closing said orifices when being fed forward, substantially as set forth.

5. A surface measuring machine, comprising, in combination: measuring-wheels, and means for feeding forward below them the blank to be measured; an adding-up mechanism, and means to transmit motion from said measuring-wheels to this mechanism; pairs of friction-wheels, one wheel of each pair being connected with the measuring-wheel adjacent to it, the other wheel of each pair being arranged in the plane of the first and to be moved off the same in said plane, so that a gap arises between the friction-wheels of each pair, the width of this gap being independent of the thickness of the blank measured; pneumatically operated braking means for these friction-wheels which are not connected with the measuring-wheels, these means comprising air-cylinders, pistons therein, double-armed braking-levers consisting each of a short arm forming a braking shoe at its end, and of a long arm forming a poise adapted to move the appertaining friction-wheel off its mate; air-pipes forming parts of the said pneumatic means and communicating with said cylinders and having their orifices located between the measuring-wheels at the points of contact between them and the blank, this latter closing said orifices when being fed forward, substantially as set forth.

6. A surface measuring machine, comprising, in combination: measuring-wheels, and means for feeding forward below them the blank to be measured; an adding-up mechanism, and means to transmit motion from said measuring wheels to this mechanism; friction wheels forming parts of the motion-transmitting means and being arranged one at either side of each measuring-wheel, and two in the planes of the other two and adapted to be swung off the same; movable arms carrying the latter two friction-wheels at their free ends; and pneumatically operated brakes for said wheels; pneumatic means arranged between said feeding means and said adding-up mechanism and adapted to cause automatically the said mechanism to operate when a blank is caused to pass through between said measuring-wheels and the said feeding means; air-pipes forming parts of said pneumatic means and having their orifices located between the measuring-wheels at the points of contact between them and the blank, this latter closing said orifices when being fed forward; and pneumatically operated means for releasing said brakes and being subjected to air-pressure when the orifices of the said tubes are closed by the blank to be measured, substantially as set forth.

7. A surface measuring machine, comprising, in combination: measuring-wheels, and means for feeding forward below them the blank to be measured; an adding-up mechanism, and means to transmit motion from said measuring-wheels to this mechanism; friction-wheels forming parts of the motion-transmitting means and being arranged one at either side of each measuring-wheel and having a smaller diameter than this wheel, and two in the planes of the other two and adapted to be swung off the same; movable arms carrying the latter two friction-wheels at their free ends: and pneumatically operated brakes for said wheels; pneumatic means arranged between said feeding means and said adding-up mechanism and adapted to cause automatically the said mechanism to operate when a blank is caused to pass through between said measuring-wheels and the said feeding means; air-pipes forming parts of said pneumatic means and having their orifices located between the measuring-wheels at the points of contact between them and the blank, this latter closing said orifices when being fed forward; and pneumatically operated means for releasing said brakes and being subjected to air-pressure when the orifices of the said tubes are closed by the blank to be measured, substantially as set forth.

8. A surface measuring machine, comprising, in combination: vertically movable measuring wheels, and means for feeding forward below them the blank to be measured; an adding-up mechanism; and pneumatic means arranged between said feeding means and said adding-up mechanism and adapted to cause automatically the said mechanism to operate when a blank is caused to pass through between said measuring-wheels and the said feeding means; air-pipes forming parts of said pneumatic means and having their orifices located between the measuring-wheels at the points of contact between them and the blank, this latter closing said orifices when being fed forward; and connections between the pipe-ends and the measuring-wheel axles, substantially as set forth.

9. A surface measuring machine, comprising, in combination: measuring-wheels, and means for feeding forward below them the blank to be measured; an adding-up mechanism; pneumatic means arranged between said feeding means and said adding-up mechanism and adapted to cause automatically the said mechanism to operate when a blank is caused to pass through between said measuring-wheels and the said feeding means; air-pipes forming parts of said pneumatic means and having their orifices located between the measuring-wheels at the points of contact between them and the blank, this latter closing said orifices when being fed forward; and a guide-roll at the free end of each air-pipe, substantially as set forth.

10. A surface measuring machine, comprising, in combination: measuring-wheels, and means for feeding forward below them the blank to be measured; and adding-up mechanism; pneumatic means arranged between said feeding means and said adding-up mechanism and adapted to cause automatically the said mechanism to operate when a blank is caused to pass through between said measuring-wheels and the said feeding means; air-pipes forming parts of said pneumatic means and having their orifices located between the measuring-wheels at the points of contact between them and the blank, this latter closing said orifices when being fed forward; an air supply-conduit for all said air-pipes; branches projecting forth from said conduit, and elastic connections between said branches and the said air-pipes, said connections being adapted to permit movements of the air-pipes relatively to the said measuring wheels and to the blank, substantially as set forth.

11. A surface measuring machine, comprising, in combination: measuring-wheels, and means for feeding forward below them the blank to be measured; an adding-up mechanism, and means to transmit motion from said measuring-wheels to this mechanism; friction-wheels forming parts of the motion-transmitting means, and pneumatically operated brakes for said wheels; pneumatic means arranged between said feeding means and said adding-up mechanism and adapted to cause automatically the said mechanism to operate when a blank is caused to pass through between said measuring-wheels and the said feeding means; air-pipes forming parts of said pneumatic means and having their orifices located between the measuring-wheels at the points of contact between them and the blank, this latter closing said orifices when being fed forward; air-cylinders connected with the said air-pipes; pistons in said cylinders; braking levers arranged to brake and to release said motion-transmitting wheels; and mechanical motion-transmitting means arranged to be actuated by the said pistons and to move the braking parts of the said levers of the friction-wheels when the pistons are lifted by the air pressed into the said pipes; a common air-supply conduit for the latter and branches projecting forth therefrom; nozzles located opposite the branch-ends and leaving each a gap between itself and the appertaining branch, the gap communicating with the appertaining cylinder, substantially as set forth.

12. A surface measuring machine, comprising, in combination: measuring-wheels, and means for feeding forward below them the blank to be measured; an adding-up mechanism, and means to transmit motion from said measuring-wheels to this mechanism; pairs of friction-wheels, one wheel of each pair being connected with the measuring-wheel adjacent to it, the other wheel of each pair being arranged in the plane of the first and to be moved off the same in said plane; pinions connected with the latter friction-wheels, and vertically disposed cogged sectors arranged to mesh with these pinions and forming arms of double-armed levers having each a poise at its other arm; an abutment-member arranged transversely above the upper ends of the cogged sectors and being adapted to be moved parallelly to itself; arms carrying said member, and means for moving automatically said arms at the proper times; pneumatically operated braking means for these friction-wheels which are not connected with the measuring-wheels, these means comprising air-cylinders, pistons therein, double-armed braking-levers consisting each of a short arm forming a braking shoe at its end, and of a long arm forming a poise adapted to move the appertaining friction-wheel off its mate; air-pipes forming parts of the said pneumatic means and communicating with said cylinders and having their orifices located between the measuring-wheels at the points of contact between them and the blank, this latter closing said orifices when being fed forward, substantially as set forth.

13. A surface measuring machine, comprising, in combination: measuring-wheels, and means for feeding forward below them the blank to be measured; an adding-up mechanism, and means to transmit motion from said measuring-wheels to this mechanism; pairs of friction-wheels, one wheel of each pair being connected with the measuring-wheel adjacent to it, the other wheel of each pair being arranged in the plane of the first and to be moved off the same in said plane; pinions connected with the latter friction-wheels, and vertically disposed cogged sectors arranged to mesh with these pinions and forming arms of double-armed levers having each a poise at its other arm; an axle carrying said double-armed levers, suspension-members connected with said axle, and another axle, from which said members are suspended; pneumatically operated braking means for these friction-wheels which are not connected with the measuring-wheels, these means comprising air-cylinders, pistons therein, double-armed braking-levers consisting each of a short arm forming a braking shoe at its end, and of a long arm forming a poise adapted to move the appertaining friction-wheel off its mate; air-pipes forming parts of the said pneumatic means and communicating with said cylinders and having their orifices located between the measuring-wheels at the points of contact between them and the blank, this latter closing said orifices when being fed forward, substantially as set forth.

In testimony whereof we affix our signatures in presence of two witnesses for each.

KARL KEHRBECK.
BRUNO PAUL BOHACEK.

Witnesses:
C. C. L. B. WYLES,
LOTE SCHARF.